Jan. 23, 1968  W. F. OTIS ET AL  3,365,246
TRACK CHAIN WITH ROLLING BUSHING
Filed Oct. 23, 1965
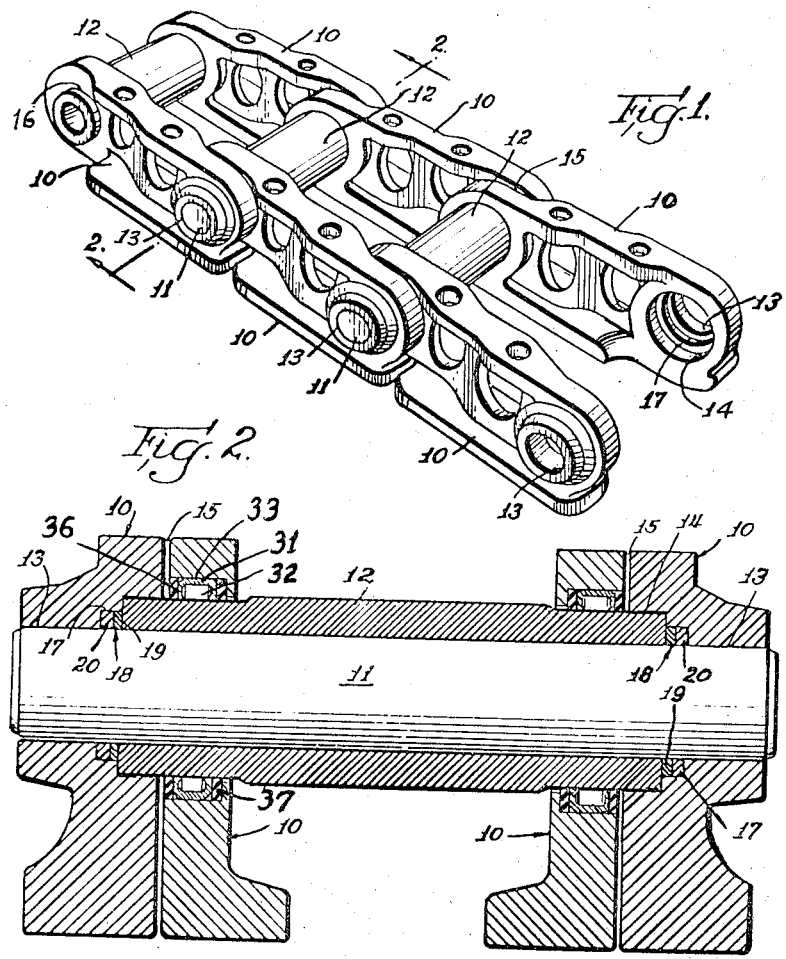
William F. Otis
Paul H. Haberle
INVENTORS
BY
Darby, Robertson & Vandenburgh

United States Patent Office 3,365,246
Patented Jan. 23, 1968

3,365,246
TRACK CHAIN WITH ROLLING BUSHING
William F. Otis, Park Ridge, and Paul H. Haberle, La Grange, Ill., assignors to Pettibone Mulliken Corporation, a corporation of Delaware
Filed Oct. 23, 1965, Ser. No. 503,765
6 Claims. (Cl. 305—11)

ABSTRACT OF THE DISCLOSURE

In a track chain, having successive pairs of side links drive fitted on a transverse pin and a bushing pivotal on the pin and sealed at its ends, the side links of the next pair lie inside of the drive fitted side links and are provided with bores therein having sealed roller bearings around the bushing.

Introduction

The invention of which the present disclosure is offered for public dissemination greatly lengthens the life of track chain for crawler tractors and other vehicles such as bulldozers.

Crawler tractors and other track-laying vehicles have for years suffered from one common complaint, the too frequent need to replace or otherwise restore worn track-carrying chains. The track-laying chain is subjected to extremely great abuse. The chain, as a whole, is necessarily exposed to water and many abrasive materials. One of the most expensive items of operating a tractor-type vehicle has been the cost of maintaining or replacing the track-laying chains and the sprockets which are worn by them. Recently there have been considerable improvements in some of the internal aspects of the chain, but that has left the problem of where the chain bushings rub or grind on the sprockets is even more forcefully calling for attention than before.

According to the present invention, wear due to abrasion between the bushings and the sprockets is greatly reduced, so that this factor will no longer be guilty of requiring, long before other failure, the removal of chains and sprockets for replacement or other repair. This is accomplished by providing a rolling bushing. In spite of the wide use heretofore in smaller and quite different chains of rollers on the bushings, this has for various reasons seemed to have been an impossible solution for the track chain problem.

Additional objects and advantages of the invention will be apparent from the following description and from the drawings.

Designation of figures

FIGURE 1 is a perspective (isometric) view of a three-link length of track-laying chain in which the present invention is used.

FIGURE 2 is a sectional view taken approximately along the line 2—2 of FIGURE 1 and showing one form of the present invention.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

Background description

As far as is apparent to the eye, the chain of FIGURE 1 could be conventional crawler chain. The chain comprises a plurality of side links 10. The links are positioned in sequential pairs. Each pair is pivotally connected to the adjacent pairs in the sequence. The structure of the pivotal conection is best illustrated in FIGURE 2. It comprises a pin 11 on which is journaled a bushing or sleeve 12. One end of each link has an opening 13 of a size to receive pin 11 while providing a so-called "drive fit." The same end of the link also has an annular recess 14 to allow that end of the link to loosely receive the adjacent end of sleeve 12. The other end of each link has an opening 16. Opening 16 has in the past been of a size to obtain a drive fit with the adjacent end of the sleeve 12. The proportions have been such that the adjacent links at a joint are in juxtaposition with a relatively small space 15 therebetween as illustrated in FIGURE 2, the drive fit having been deemed necessary to maintain the clearances 15.

According to a recent invention (Patent 3,206,258, Heinrich) the life of the surfaces between bushing 12 and side link 10 has been greatly prolonged. An annular recess 17 is provided in the one end of each link just beyond the respective end of the sleeves 12. Within opening 17 is positioned a seal generally 18.

Seal 18 comprises a hardened wear-resistant seal ring 19 which, with a polished or lapped surface, abuts the hardened, wear-resistant, mating end of sleeve 12. Bonded to seal ring 19 is an annular resilient member 20. Bonding may be by cement, but vulcanizing the member 20 to the seal ring 19 has been suggested by skilled consultants and is preferred.

Rolling bushing

According to the present invention, it has been discovered that the drive fit between bushing 12 and the links 10 can be dispensed with. This, together with overcoming a very severe problem of providing bearings without disastrous loss of strength, has permitted the provision of bushings 12 which roll freely so that as they come into mesh with and leave the sprockets they no longer grind thereon, but roll.

In the illustrated form of the invention, a cage 31 with a circle of needle bearings 32 therein is driven into an enlarged aperture 33 in side links 10. The structure of this end of side link 10 could be made far too weak if the usual separate internal bearing race was provided by slipping a bearing ring over the bushing 12. Instead of this, the reduced end of bushing 12 is ground to serve as the bearing race. It is believed that with smooth grinding the exquisite lapping usually performed on bearing races will not prove necessary.

The roller bearings are protected from dirt and water by rubber bushings 36 and 37. These bushings are of a size to press resiliently and firmly against the walls surrounding them, and resiliently and lightly against the ground surface of bushing 12.

Other bearings and rolling bearings can be used with less certainty that abrasive action will be as well eliminated between the bushing and the sprocket, but with greater certainty that the strength of the links will never prove inadequate. To this end, the bore 33 can be of smaller internal diameter and have pressed into it a stainless steel or Teflon bearing, or there may be no counterbore 33, but the inner surface thereof may be induction hardened. With all of these forms, however, the rubber seals should be used on both sides of the bearing area, and special counterbores or grooves may be provided for such seals.

Of course, if the counterbore 33 is not of as large diameter as shown, the seals would also not be of such large diameter. It should be understood that the bushing 12 does not have a pressed fit with the outer end portions of the adjacent links 10, but is of a size compared to the bore therein to roll freely. At initial manufacture, bushing 12 may bind at its end surfaces, since the conventional method of assembly is to press the links home against the ends of bushing 12. This soon loosens up in use, however, and if it is found that the bushing does not quickly reach the free rolling state, arrangements may be made in assembly, either not to drive the links quite home, or to drive them home and back them off minutely.

Of course, there are times when there will be considerable axial thrust which could cause resistance to the free turing of bushing 12, but this will be a very small percentage of the hours in which the crawler device is operating, and hence the abrasion which may occur at that time between the bushings and the sprockets will be only a very small percentage of the present abrasion. Likewise, there may be some increased wear between the faces of the two links which heretofore have been separated by the clearance 15, but again that wear is not deemed to be likely to be excessive in view of the fact that it will occur chiefly when there is heavy side thrust, a small percentage of the time.

If the bearing is a hardened portion of the link, the seals may be O-ring seals. They may be held in enlarged bores on opposite sides of each inner end by metal rings L-shaped in cross-section, pressed into the enlarged bores, with the inwardly extending flange of each retaining ring outside of the O-ring.

The bushings as heretofore used are hardened inwardly from all of their surfaces, and need no added hardening for this purpose.

There should be lubrication. A grease fitting fully countersunk in the end of the pin 11 at the exposed end can be conected by an axial passage and two radial passages, each leading to a groove around pin 11, each of which in turn leads to another radial passage, through the bushing to the bearing area between the bushing and the side link.

I claim:

1. Crawler chain including: a series of pairs of offset side links, pins, and bushings pivotal on the pins, wherein each pair of side links includes inner end portions located between outer end portions of an adjacent pair of links; the outer ends having bores therein engaging the associated pins with drive fits;

said inner ends having bores therein and having in the bores bearing means engaging a ground surface of the bushing, and waterproof and dustproof seals carried by the inner ends, located on each side of the bearing area, and engaging the bushing slidingly and resiliently.

2. Crawler chain including: a series of pairs of offset side links, pins, and bushings pivotal on the pins, the side links include inner end portions located between outer end portions of an adjacent pair of links; the outer ends having bores therein engaging the associated pins with drive fits, and receiving the bushings freely in counterbores in the outer ends;

said inner ends having bores therein and having in the bores bearing means engaging a ground surface of the bushing, and waterproof and dustproof seals carried by the inner ends, located on each side of the bearing area, and engaging the bushing slidingly and resiliently.

3. Crawler chain including: a series of pairs of offset side links, pins, and bushings pivotal on the pins, the side links include inner end portions located between outer end portions of an adjacent pair of links; the outer ends having bores therein engaging the associated pins with drive fits, and receiving the bushings freely in counterbores in the outer ends;

said inner ends having bores therein and having in the bores rolling bearing means engaging a ground surface of the bushing, and waterproof and dustproof seals carried by the inner ends, located on each side of the bearing area, and engaging the bushing slidingly and resiliently.

4. Crawler chain including: a series of pairs of offset side links, pins, and bushings pivotal on the pins, the side links include inner end portions located between outer end portions of an adjacent pair of links; the outer ends having bores therein engaging the associated pins with drive fits, and receiving the bushings freely in counterbores in the outer ends;

said inner ends having bores therein and having in the bores rolling bearing means engaging the bushing, and waterproof and dustproof seals carried by the inner ends, located on each side of the bearing area, and engaging the bushings slidingly and resiliently.

5. Crawler chain including: a series of pairs of offset side links, pins, and bushings pivotal on the pins, the side links include inner end portions located between outer end portions of an adjacent pair of links; the outer ends having bores therein engaging the associated pins with drive fits, and receiving the bushings freely in counterbores in the outer ends;

said inner ends receiving the bushings freely therein; and roller bearings means carried by the inner ends and engaging the bushing, and waterproof and dustproof seals carried by the inner ends; said bearing being immunized as to water and dust.

6. Crawler chain including: a series of pairs of offset side links, pins, and bushings pivotal on the pins, the side links include inner end portions located between outer end portions of an adjacent pair of links; the outer ends having bores therein engaging the associated pins with drive fits, and receiving the bushings freely in counterbores in the outer ends;

said inner ends receiving the bushings freely therein, and roller bearing means carried by the inner ends and engaging the bushing, and waterproof and dustproof seals carried by the inner ends; and seal means protecting the bearing from water and dust.

References Cited

UNITED STATES PATENTS

| | | | |
|---|---|---|---|
| 2,428,060 | 9/1947 | Albrecht | 74—256 |
| 2,911,840 | 11/1959 | Muller et al. | 74—256 |
| 3,050,346 | 8/1962 | Simpson et al. | 74—255 X |
| 3,206,258 | 9/1965 | Heinrich | 305—11 |
| 3,279,868 | 10/1966 | Jacob | 74—256 X |

FRED C. MATTERN, JR., *Primary Examiner.*

J. A. WONG, *Assistant Examiner.*